United States Patent [19]

Kaczkos

[11] 4,395,591
[45] Jul. 26, 1983

[54] ARRANGEMENT FOR SUPPORTING A TELEPHONE HANDSET OR THE LIKE

[75] Inventor: John E. Kaczkos, Elk Grove Village, Ill.

[73] Assignee: GTE Automatic Electric Labs Inc., Northlake, Ill.

[21] Appl. No.: 308,863

[22] Filed: Oct. 5, 1981

[51] Int. Cl.³ .............................................. H04M 1/02
[52] U.S. Cl. ............................ 179/100 R; 179/100 C; 179/146 R; 179/178
[58] Field of Search .......... 179/100 R, 100 D, 100 C, 179/147, 159, 160, 161, 164, 178, 179, 146 R

[56] References Cited

U.S. PATENT DOCUMENTS

| | | | |
|---|---|---|---|
| 2,949,509 | 8/1960 | Whidden | 179/100 C |
| 3,073,911 | 1/1963 | Mattke et al. | 179/100 C |
| 3,941,951 | 3/1976 | Engstrom et al. | 179/100 C |
| 4,107,481 | 8/1978 | Redshaw | 179/164 |
| 4,188,512 | 2/1980 | Lord | 179/159 |

Primary Examiner—G. Z. Rubinson
Assistant Examiner—Randall P. Myers
Attorney, Agent, or Firm—Anthony Miologos; Robert J. Black

[57] ABSTRACT

A telephone handset support which will allow a telephone substation to be used as either a desk or wall unit, wherein, the telephone base includes a T-shaped cavity on a face thereof, arranged to accept therein a similarly shaped retainer. The retainer is alternatively positionable to be substantially housed within the cavity, allowing the telephone instrument to be horizontally mounted, or to have an included hook extend outward of the cavity. The hook engages an orifice on the handset supporting the handset to the base when vertically mounted.

4 Claims, 4 Drawing Figures

ARRANGEMENT FOR SUPPORTING A TELEPHONE HANDSET OR THE LIKE

BACKGROUND OF THE INVENTION

(1) Field of the Invention

This invention relates in general to a telephone substation apparatus and more particularly to a telephone handset support which can allow a telephone substation to be used as either a desk or wall unit.

(2) Description of the Prior Art

For many years the telephone industry has recognized the desirability of manufacturing a telephone substation apparatus or telephone instrument which may be used as a desk unit or a wall unit. One of the problems encountered in designing such a telephone instrument is how to support the handset on the base. It is desirable that the handset rest on the base in the same position no matter whether the base is horizontal or vertical. However, in most telephone instruments the weight of the handset is the force that is used to maintain it on the base, and of course as the base shifts in position from the horizontal to vertical the direction in which the force acts also changes. Therefore, the type of handset support that operates best in one position may not be needed or may actually interfere with the use of the handset in the other position. Further, since telephone subscribers are now allowed to purchase their own telephone instruments it becomes desirable from a retail standpoint to be able to offer a telephone instrument which can be either desk or wall mounted. This arrangement would be advantageous to the consumer allowing him to purchase a single telephone which can be used for example, in the kitchen where telephones are typically wall mounted, or the living room where the telephone is usually placed on a horizontal surface. Additionally, this is also an advantage to the manufacturer, dispensing with the necessity for the manufacturer to design and produce two distinctly different telephones for a particular type of mounting.

U.S. Pat. No. 3,073,911, to C. F. Mattke, et al., teaches a telephone set which is operable in either a vertical or horizontal position. A support hook is provided which can be adjusted out of the base to support the handset to the telephone base when wall mounted. The telephone in this case must be disassembled in order to make the adjustment. This typically requires trained telephone service personnel. In most cases a consumer with limited technical knowledge would not be able to perform such an adjustment.

Accordingly, it is an object to the present invention to provide a novel and improved handset support which can be easily manipulated by the telephone subscriber allowing the telephone instrument to be alternatively used as a desk or wall unit.

SUMMARY OF THE INVENTION

In accomplishing the object of the present invention, there is provided a telephone instrument having a handset unit of a particular form and base unit having an external form complimentary to that of the handset.

The handset is comprised of a front and back shell with the front shell including a transmitter portion and a receiver portion. The base unit includes a top surface inwardly recessed complimentary to the handset receiver and transmitter portions forming receiver and transmitter accepting areas respectively. The receiver and transmitter accepting areas are separated by a transversely oriented support member. The support member is generally wedge shaped with an angularly displaced surface forming the rear wall of the receiver accepting area.

The handset support arrangement according to the principles of the present invention includes a T-shaped handset retainer and a similarly shaped cavity on the support structure. The retainer includes a central body forming one arm of the T and an angularly displaced hook portion forming a second arm. The body portion includes a cavity on the top and bottom surfaces each arranged to accept therein telephone number identifying indicia and a protective cover.

The T-shaped retainer is arranged to be accepted within the support structure cavity whereby, in a first position the retainer including the hooked portion lie substantially flush with the associated base support structure surfaces. With the retainer in this position the handset unit receiver and transmitter portions are retained by the base unit receiver and transmitter accepting areas allowing the telephone instrument to be rested on a horizontal surface.

In order for the telephone instrument to be used on a vertical surface the retainer is alternatively positionable into a second position, by manually rotating the retainer 180° and placing the body portion within the associated support structure cavity. Thereby, allowing the hook unit to extend outward of its associated support structure surface. The hook is then able to engage a cavity on the receiver portion of the handset unit retaining the handset to the base unit.

DESCRIPTION OF THE DRAWINGS

A better understanding of the invention may be had from the consideration of the following detailed description taken in conjunction with the accompanying drawings in which:

It should be noted that the handset shown on FIG. 2 and FIG. 3 is illustrated in broken line disclosure for ease of understanding the handset support operation.

DESCRIPTION OF THE PREFERRED EMBODIMENT

Figure 1A:
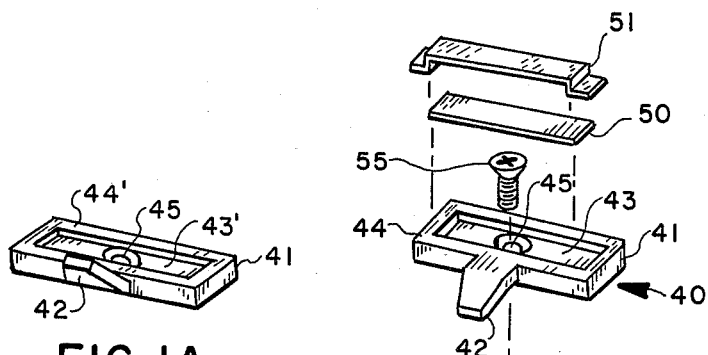
FIG. 1A is the handset retainer of FIG. 1 rotated 180°.
Figure 1:
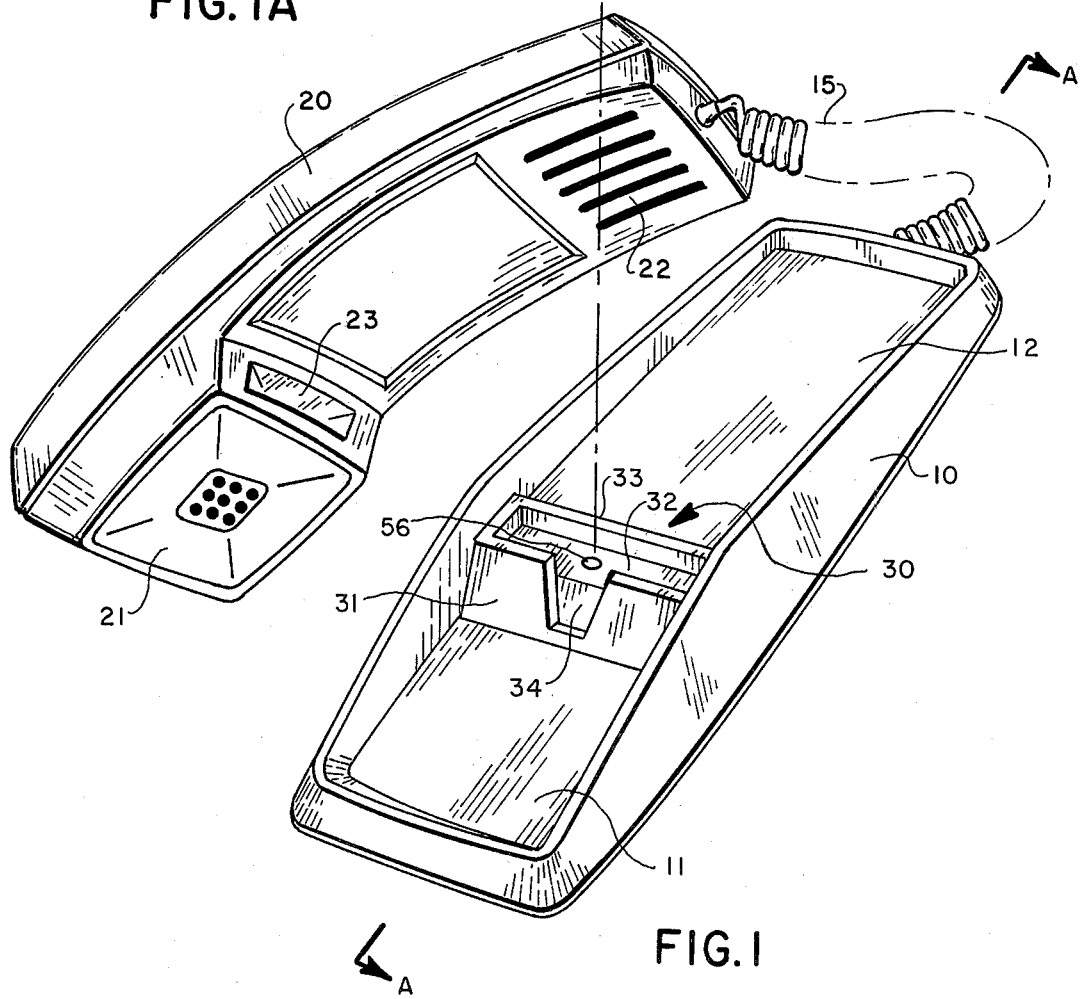
FIG. 1 is a perspective view of a telephone instrument of the type to which the invention may be used to advantage, including the handset retainer in accordance with the present invention.

Referring now to the accompanying drawings of the present invention, FIG. 1 illustrates a telephone instrument of the type to which the invention may be applied. The telephone instrument is comprised of a base unit 10 connected to a handset unit 20 by handset cord 15. The handset further includes a front shell having a receiver portion 21 along with a cavity 23 and a transmitter portion 22 on an end opposite the receiver portion.

The top surface of base unit 10 is defined by inwardly recessed receiver and transmitter accepting areas 11 and 12 respectively. The receiver and transmitter accepting areas are separated by a transversely oriented support member 30. The support member is generally wedged shaped with an angularly displaced side surface 31 forming the rear wall of the receiver accepting area 11. The support structure further includes a T-shaped cavity. The cavity includes a first area 32 defined by outer walls 33 and a second area 34 extending from the first area along support structure wall 31.

The cavity is arranged to accept a handset support retainer 40 therein.

Retainer 40 includes a main body portion 41 and an angularly extending hook portion 42. Body portion 41 includes a top surface having a cavity 43 defined by walls 44. A similar cavity 43' defined by walls 44' on a bottom surface of the body portion 41 is also provided as shown on FIG. 1A.

Cavities 43 and 43' are arranged to accept a paper insert 50, typically having the telephone number printed thereon and a protective clear plastic cover 51. Cover 51 snaps into walls of 44 or 44' and holds strip 50 in place within the appropriate cavity. The retainer assembly is completed by a bore 45 having counter sunk faces and centrally located within cavities 43 and 43'. Bore 45 is arranged to accept a threaded fastener 55 therein to secure handset retainer 40 to the support structure. A threaded bore 56 is provided on surface 32 to accept fastener 55.

Figure 2:
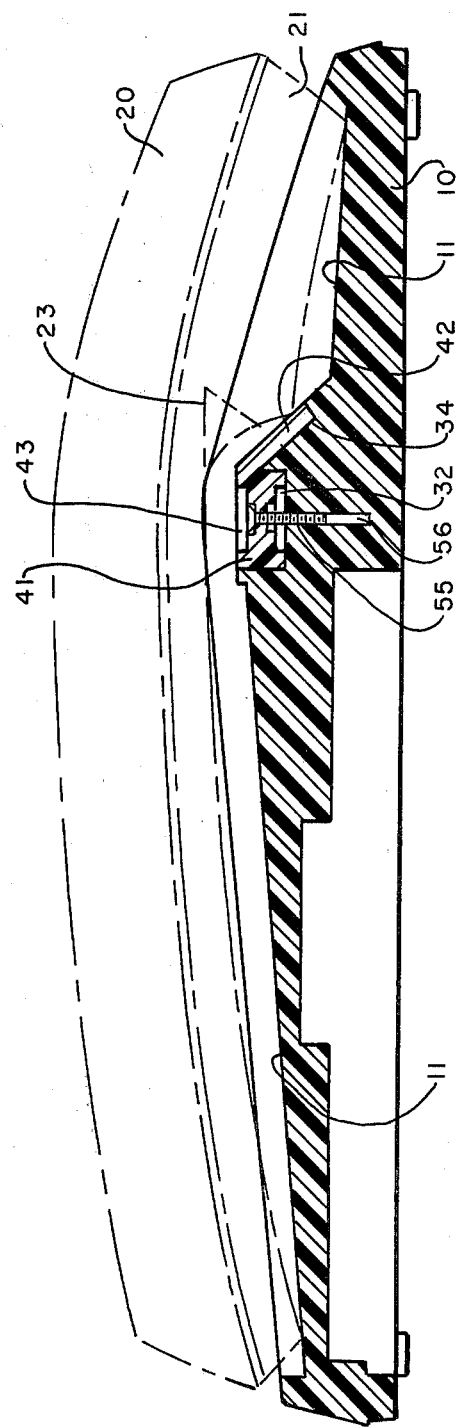
FIG. 2 is a sectional view of the base unit illustrated in FIG. 1, taken substantially along line A—A showing the base arranged for use on a horizontal surface.

Turning now to FIG. 2, base 10 is shown situated horizontally with handset 20 (shown in broken line) resting normally on the base. With the handset in this position retainer body portion 41 sits within cavity area 32 and hook 42 lies within cavity area 34. Hook 42 forms a flush surface with surface 31 allowing receiver 21 to be rested within receiver accepting area 11 without interference from the retainer.

Retainer 40 is secured in place by a threaded fastener 55 which travels through bore 45 on the retainer and engages threaded bore 56 on the support structure.

Figure 3:
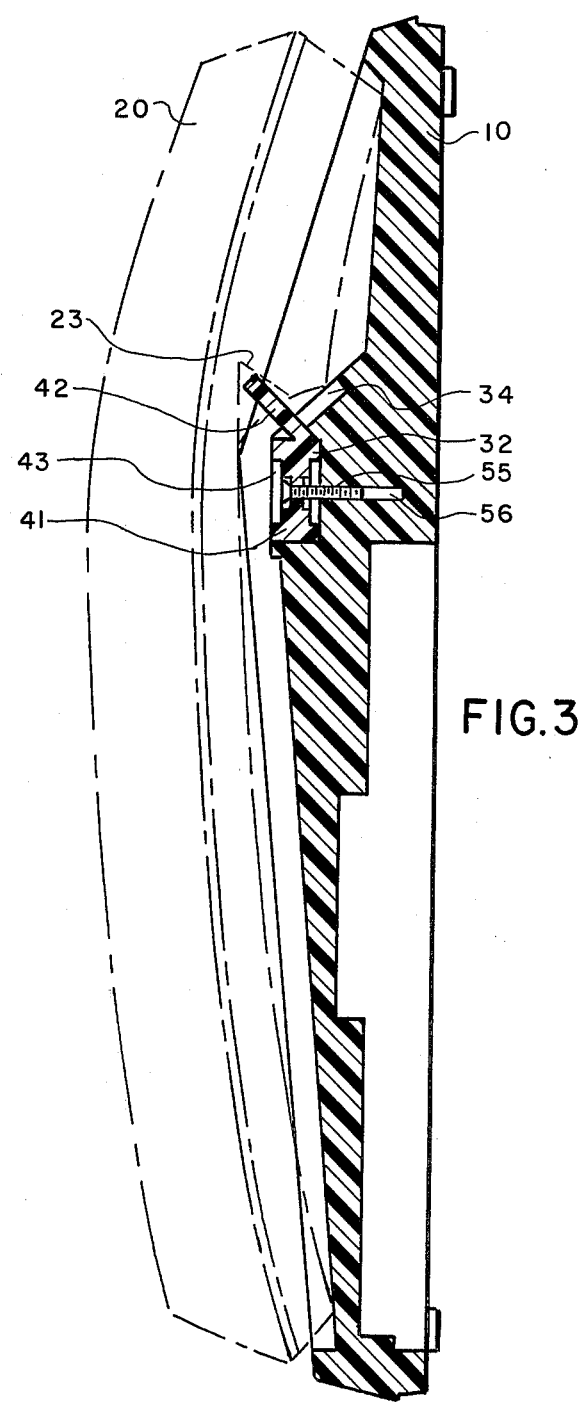
FIG. 3 is a sectional view of the base unit illustrated in FIG. 1, taken substantially along line A—A showing the base arranged for use on a vertical surface.

In order to retain handset 20 to base 10 when the telephone is desired to be wall mounted, retainer 40 is removed from the support structure 30 by withdrawing fastener 55, removing and rotating the retainer 180° and placing it in the support structure as shown in FIG. 3. As can readily be seen in this configuration retainer body 41 rests within cavity area 32 on the support structure. Hook 42 now extends outward of cavity 34 and engages orifice 23 on handset 20 when the handset is returned to the base. Fastener 55 is then replaced within bore 45 and engaged to threaded bore 56. Handset 20 is thus maintained on the base unit 10 by the now provided hook 42.

The present invention has been described with reference to a specific embodiment thereof, for the purpose of illustrating the manner in which the invention may be used to advantage. It will be appreciated by those skilled in the art that the invention is not limited thereto. Accordingly, any and all modifications, variations or equivalent arrangements which may occur to those skilled in the art should be considered to be within the scope of the invention.

What is claimed is:

1. A telephone base arranged to accept a telephone handset on a face thereof, said face including a support structure transversely oriented along said face, said support structure including a T-shaped cavity arranged to substantially accept therein a similarly shaped handset retainer, said handset retainer including a hook substantially stored within said T-shaped cavity in a first position and alternatively said handset retainer positionable in a second position allowing said hook to extend outward of said cavity, whereby said hook engages said handset retaining said handset to said base.

2. A telephone base as claimed in claim 1, wherein: said handset includes an orifice and said orifice accommodates said hook retaining said handset to said base.

3. A telephone base arranged to accept a telephone handset on a face thereof, said handset including an orifice and said face including a support structure transversely oriented along said face, said support structure including a T-shaped cavity arranged to substantially accept therein a similarly shaped handset retainer, said handset retainer including a body portion and a hook portion each substantially accepted within said cavity in a first stored position and said handset retainer alternatively positionable into a second position having said body portion substantially accepted within said T-shaped cavity with said hook portion extending outwardly of said cavity, whereby said hook is accommodated by said handset orifice retaining said handset to said base.

4. A telephone base as claimed in claim 3, wherein: said retainer includes first and second surfaces and each surface includes a cavity, said first retainer surface arranged to accept a designation strip and designation strip cover therein when said retainer is in said first position, and alternatively said second retainer surface arranged to accept a designation strip and designation strip cover therein when said retainer is in said second position.

* * * * *